UNITED STATES PATENT OFFICE.

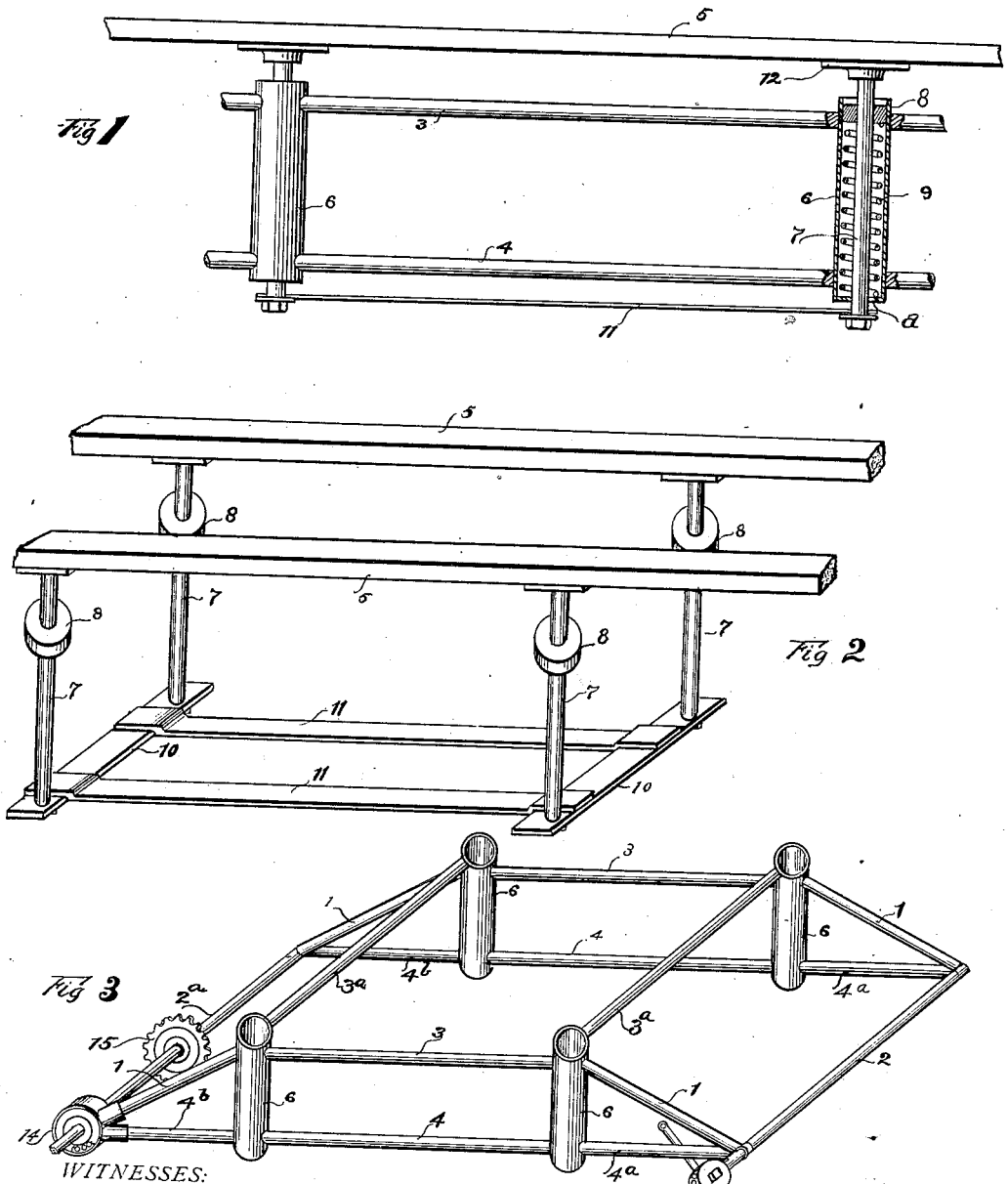

ABI MAYERSON, OF PUEBLO, COLORADO.

AUTOMOBILE PNEUMATIC SPRING.

1,094,372.                Specification of Letters Patent.    Patented Apr. 21, 1914.

Application filed February 8, 1911. Serial No. 607,300.

*To all whom it may concern:*

Be it known that I, ABI MAYERSON, a citizen of the United States, residing at Pueblo, Colorado, have invented certain new and useful Improvements in Automobile Pneumatic Springs, of which the following is a specification.

My invention relates to an automobile pneumatic spring device in which an air cushion is combined with spring means; and the objects of my invention are, to provide more economical spring means for automobile vehicle frames, to furnish a spring means whereby the whole weight will not come upon the spring alone, and to furnish a means that is readily combined with the building of an automobile frame. I attain these objects by the mechanism illustrated in the accompanying drawings, in which:

Figure 1 is a side elevation view of a part of a truss frame with the spring containing cylinder partly broken away; Fig. 2 is a perspective view showing the pistons and sustaining frame attached thereto; and Fig. 3 is a perspective view showing the automobile truss frame and cylinders.

Similar numerals refer to similar parts throughout the several views.

An automobile truss frame composed of lower rails 4 attached to the lower ends of the cylinders 6, and the parts $4^a$ and $4^b$ attached to the lower cylinders 6 also attached to the axles 2 and $2^a$, has the rails 3 attached to the upper ends of the cylinders 6, and connected by the parts 1 with the axles and said cylinders. Cross supports $3^a$ are also joined to said cylinders 6. Shafts 7 of suitable length have each provided thereon a piston 8 that is closely fitting in the interior of each of the cylinders 6. The frame, composed of upper bars 5 and suitable lower bars 10, and distance pieces 11, is attached to said shafts as shown in Fig. 2. A spiral spring 9 surrounds each of said shafts 7, the upper end resting upon said piston 8 and the lower end of said spring resting on the bottom of said cylinder. A suitable space or vent *a* may be provided around the shaft 7 at the lower part of each cylinder 6 to permit the air to escape in the amount desired for operation. The body may be placed upon the side pieces 5, and the engine and machinery upon the connecting parts 11. The sprocket wheel 15 is shown by means of which power may be conveyed to the rear axle, and the ball bearings attachment for each axle is shown in 14. I have shown also the spindle attachment 13 for the front axle. By this means it is seen that the spiral springs 9 in each cylinder take the ordinary and usual weight of the load, and that any unusual or sudden load, instead of falling entirely upon the springs, will be taken up by the cushion of air formed in each cylinder 6 by reason of the piston 8 operating therein; and by reason of appropriate discharge of air from said cylinder the weight does not go so suddenly upon said spring as to close it, and the air is permitted to escape so that the jar is avoided.

I claim:—

1. In an automobile pneumatic spring of the character described, in combination with a frame attached to the carrying axles; cylinders disposed in said frame adjacent to the corners thereof; and a carrying frame; shafts attached to said carrying frame and adapted to operate perpendicularly in said cylinders with pistons thereon and adapted to permit an escape of air past said pistons; spiral spring means disposed in said cylinders adapted to receive the weight to be carried, all substantially as set forth.

2. In an automobile pneumatic spring of the character described, upright cylinders disposed in the frame of an automobile attached to the axles; a frame structure above and below said cylinders connected by shafts corresponding to the number of cylinders and adapted to operate therein; a piston on each shaft adapted to operate in each cylinder and also adapted to permit the escape of compressed air; spiral spring means disposed in each cylinder operative against the said piston and the bottom of said cylinder, all substantially as set forth.

3. In combination, two separately constructed frames, vertically arranged cylinders fixed to one of said frames and provided with vents, pistons connected to the other frame and designed to fit and work in said cylinders, and springs in the cylinders to force the pistons in one direction away from the vents, said vents allowing for escape of air from the cylinders when the pistons are moved in the opposite direction against the pressure of the springs.

ABI MAYERSON.

Witnesses:
R. R. MILLER,
MAUDE S. ENGLE.